United States Patent [19]

Serizawa

[11] 4,386,719
[45] Jun. 7, 1983

[54] CONSTANT FEED APPARATUS

[76] Inventor: Nobuo Serizawa, 7-3, Oyamadai 2-chome, Setagayaku, Tokyo, Japan

[21] Appl. No.: 167,215

[22] Filed: Jul. 9, 1980

[30] Foreign Application Priority Data

Jul. 10, 1979 [JP] Japan ................................. 54-87193

[51] Int. Cl.³ ....................... B65D 83/06; B65G 53/16
[52] U.S. Cl. .................................... 222/242; 222/190; 222/410; 239/654; 239/671; 239/689; 406/48; 406/52; 406/122; 406/124; 406/135
[58] Field of Search ....................... 406/48, 52, 66, 70, 406/102, 122, 124, 135; 222/239–242, 410, 411, 190, 236, 238, 547, 564; 239/650, 652, 654, 656, 663, 668, 669, 671, 689

[56] References Cited

U.S. PATENT DOCUMENTS

| | | | |
|---|---|---|---|
| 486,451 | 11/1892 | Espel | 222/239 |
| 950,931 | 3/1910 | Leggett | 239/654 |
| 1,673,827 | 6/1928 | Hurtt et al. | 222/242 X |
| 1,750,147 | 3/1930 | Wright | 406/135 X |
| 3,132,769 | 5/1964 | Zehrbach | 222/242 X |
| 3,193,155 | 7/1965 | Hazen | 222/240 X |
| 3,861,599 | 1/1975 | Waggoner | 239/654 |
| 3,995,775 | 12/1976 | Birkmeier et al. | 406/135 X |
| 4,020,980 | 5/1977 | Illes, Jr. | 222/411 |
| 4,167,248 | 9/1979 | Akazawa et al. | 222/242 X |
| 4,177,940 | 12/1979 | McHugh | 222/240 X |

FOREIGN PATENT DOCUMENTS 753473 7/1956 United Kingdom ................ 239/654

OTHER PUBLICATIONS

Brochure for a "Shelter Shield, Insulating Equipment, Model 400", Published by Diversified Insulation Inc., Hamel, MN., Feb. 1977.

Primary Examiner—Andres Kashnikow
Attorney, Agent, or Firm—Wenderoth, Lind & Ponack

[57] ABSTRACT

A constant feed apparatus in which a straight tubular housing into which a material is fed has provided therein at least one rotary arm which rotates in the proximity of the bottom surface of the tubular housing, and at least one discharging port is provided in the internal surface of the tubular housing which the rotary arm comes to oppose while the rotary arm is rotating, whereby the material in the tubular housing is conveyed to the discharging port by the rotary arm and discharged out through the discharging port.

5 Claims, 58 Drawing Figures

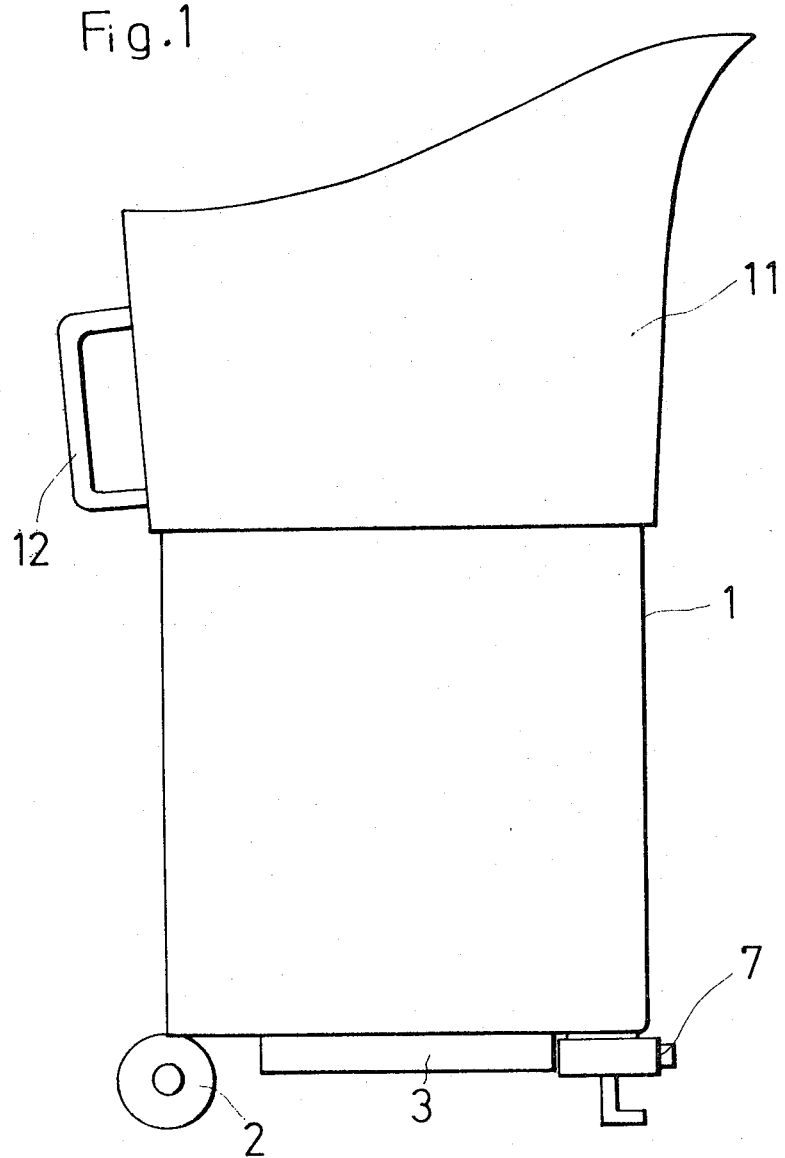

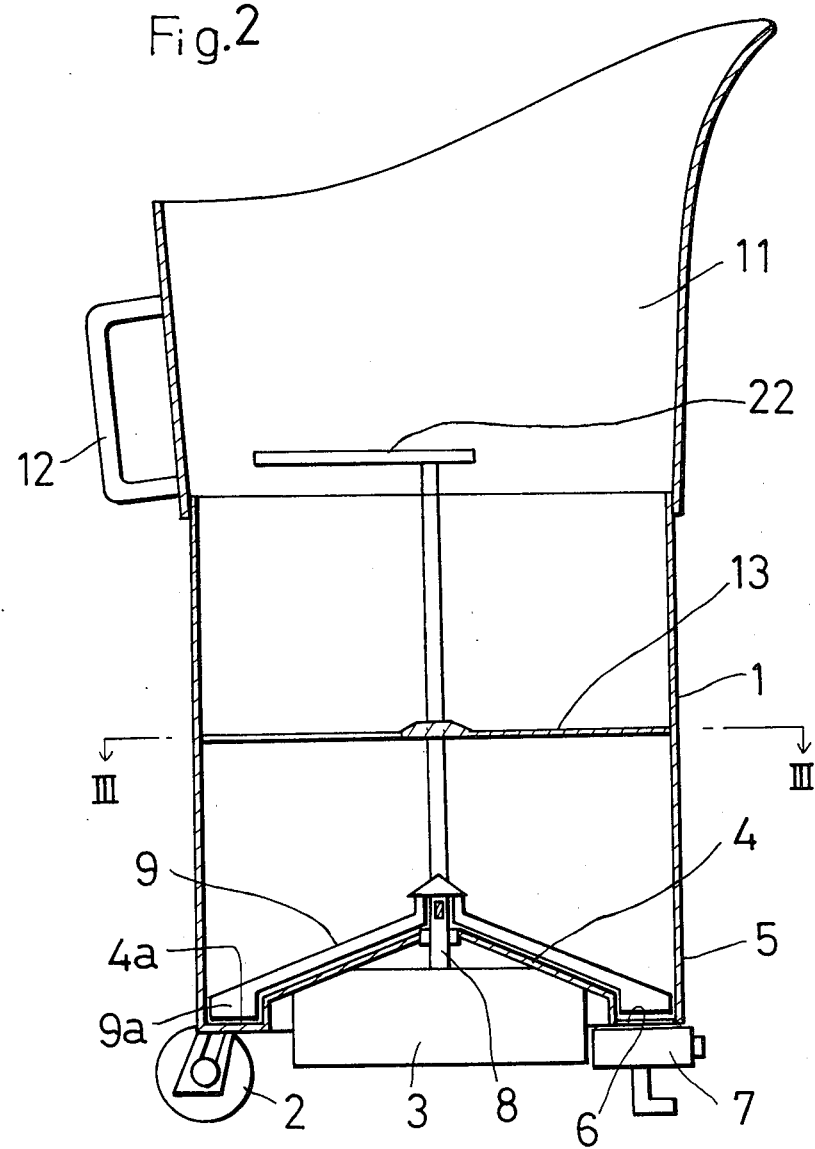

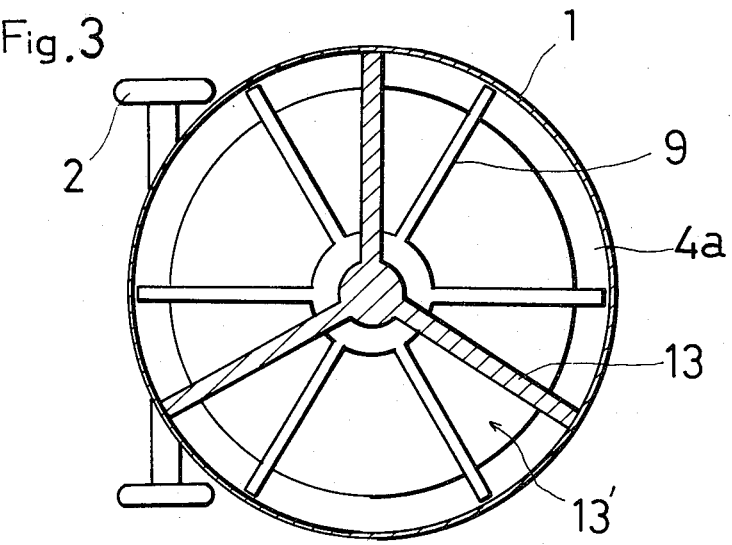
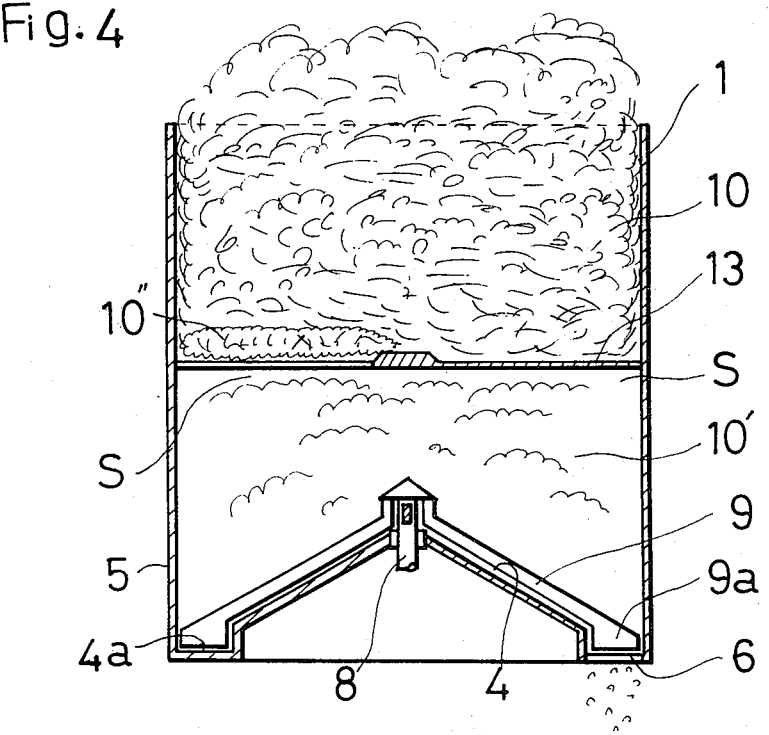

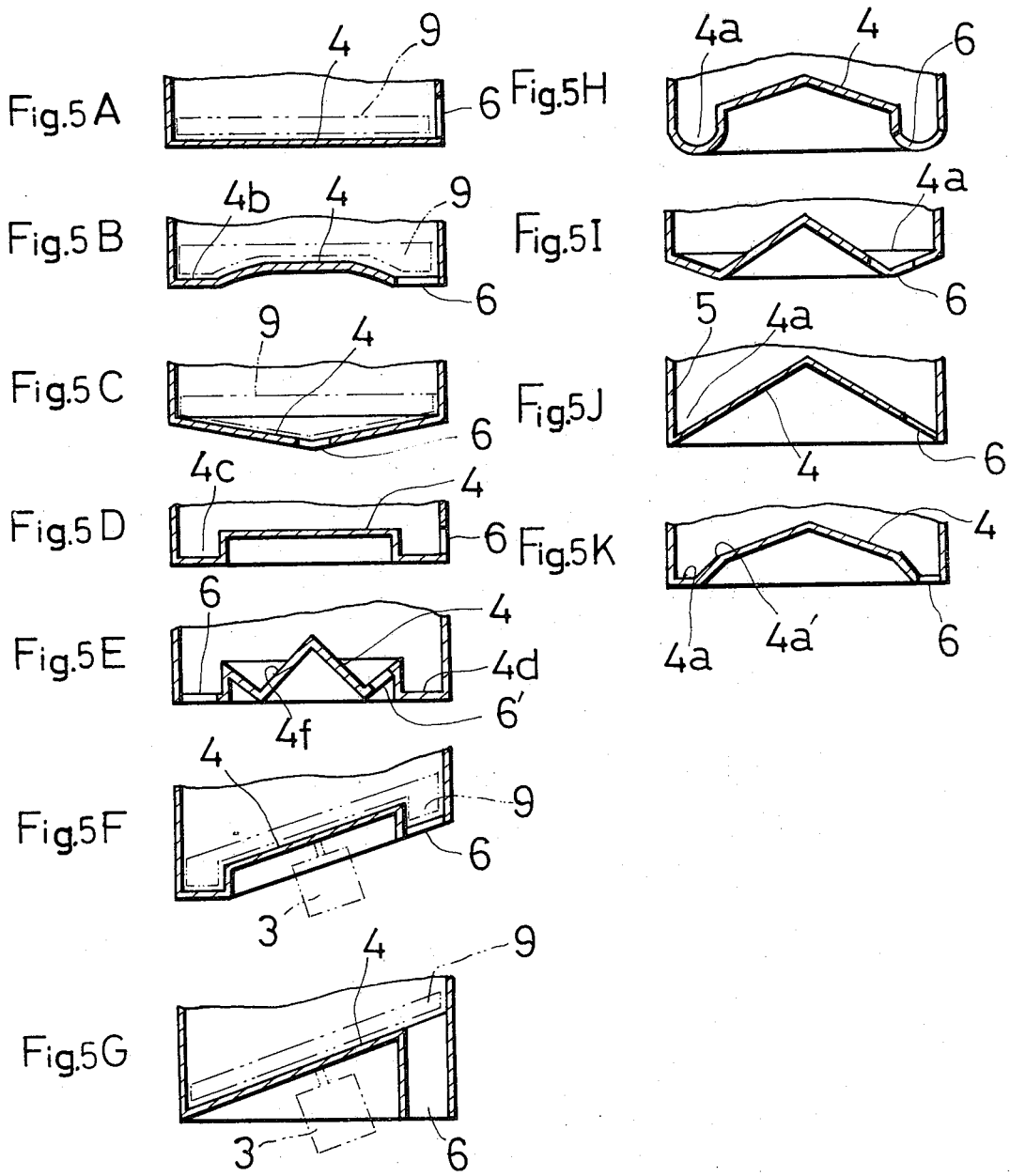

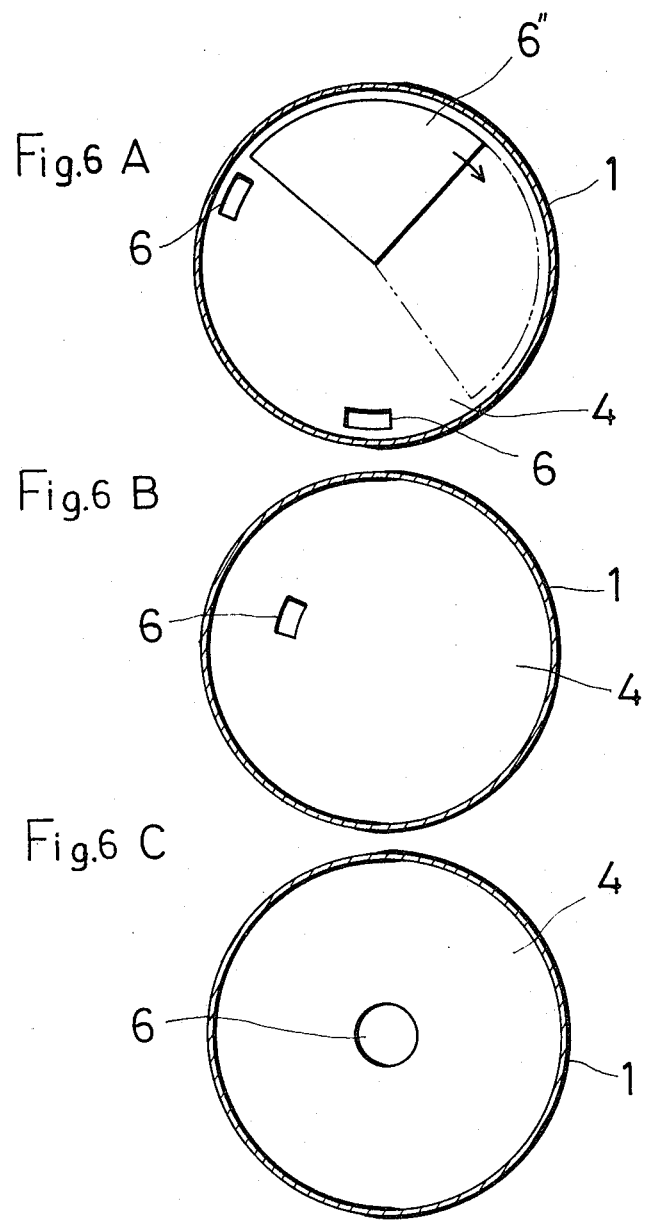

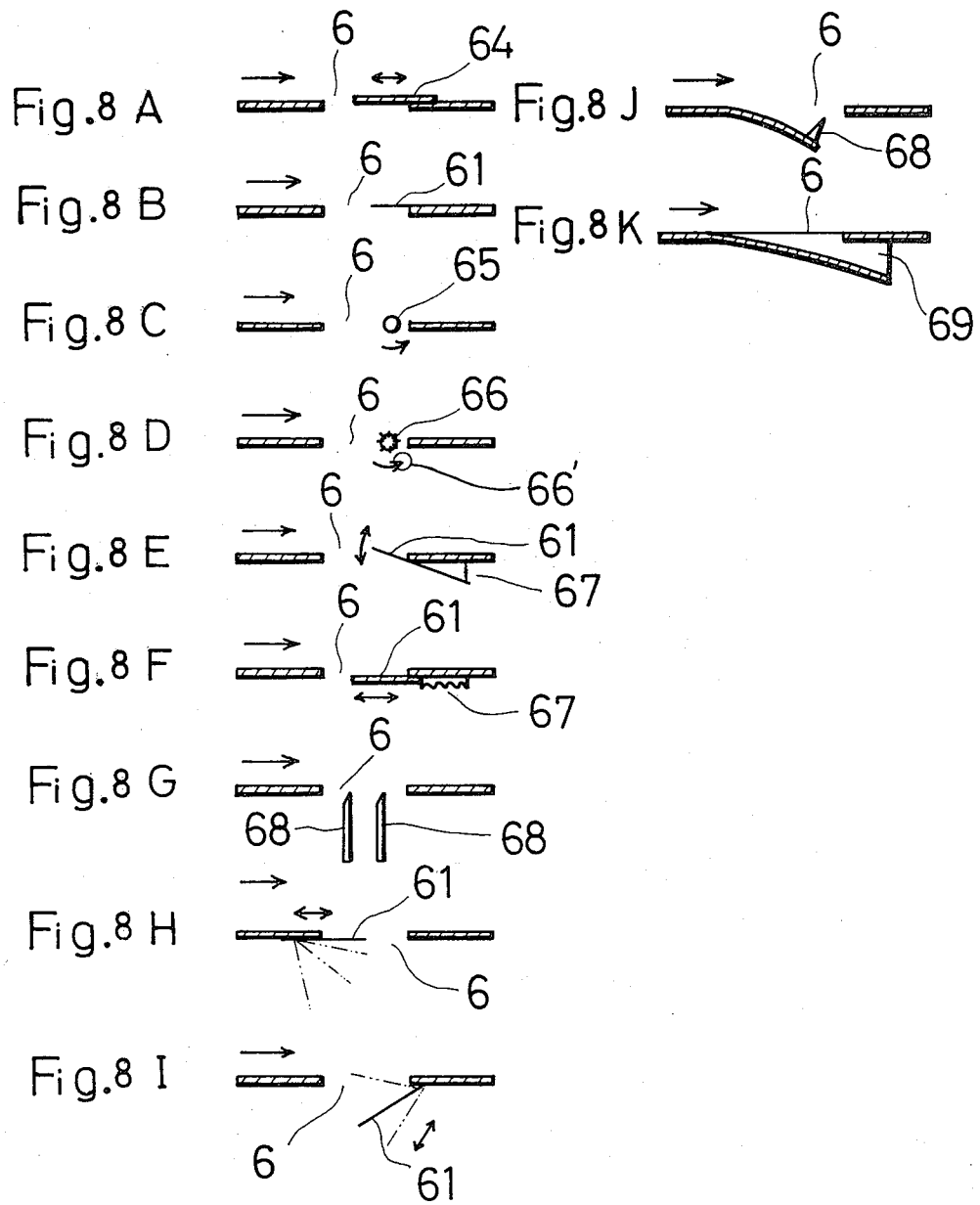

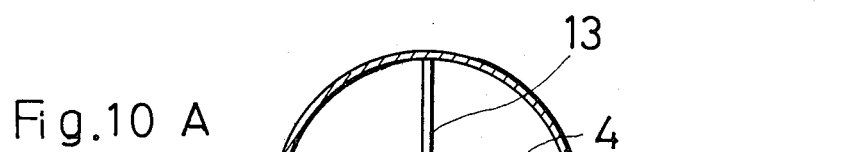
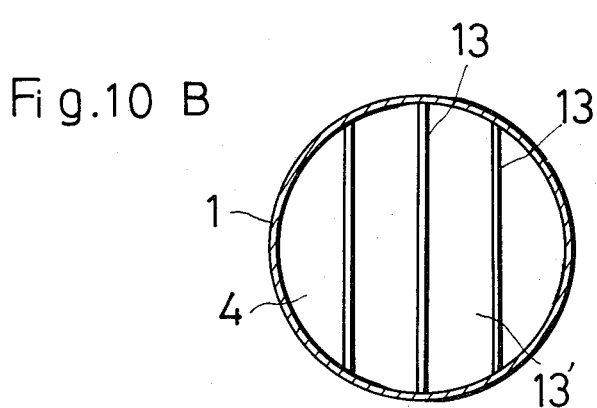
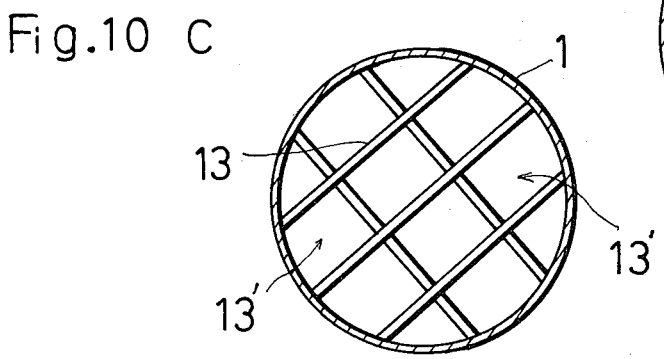
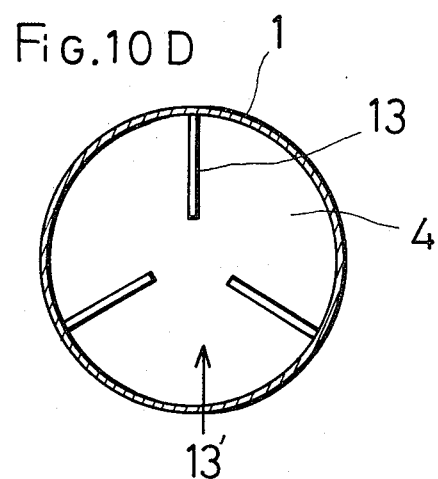
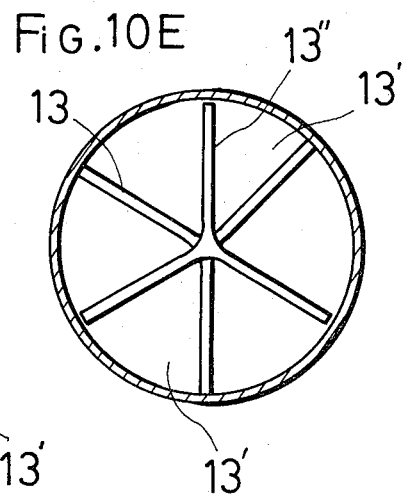

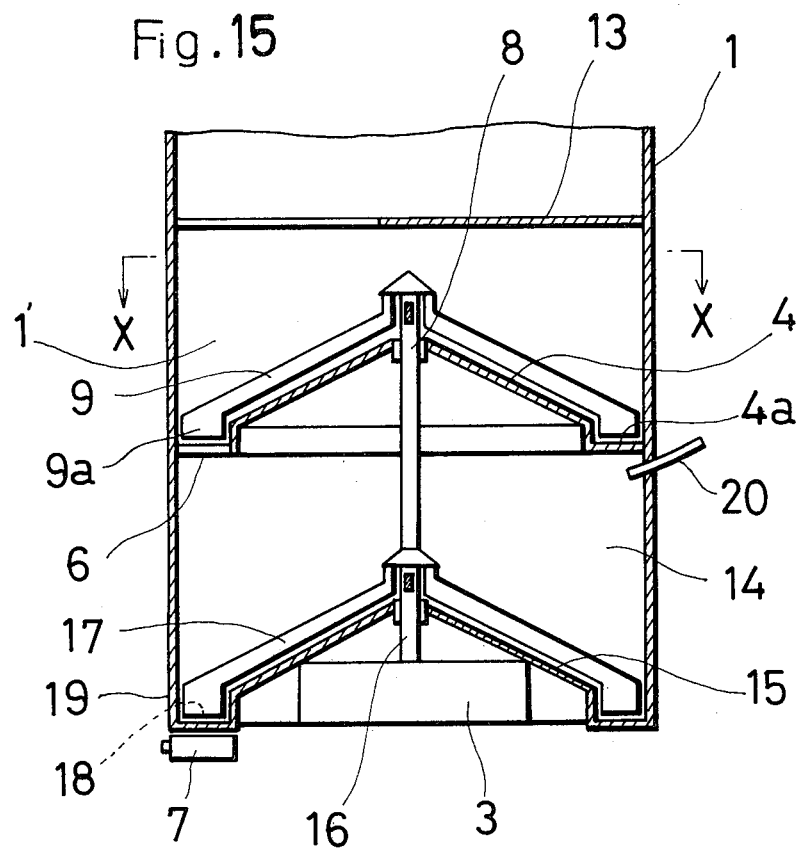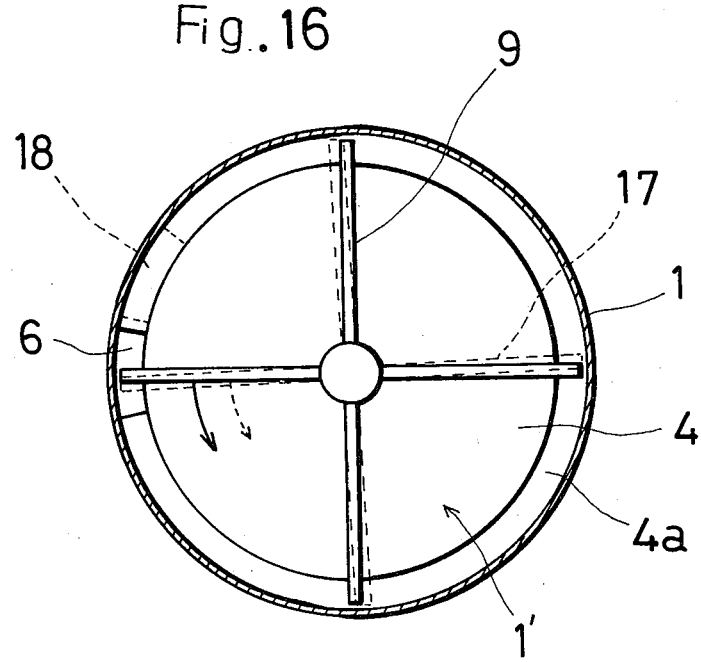

CONSTANT FEED APPARATUS

BACKGROUND OF THE INVENTION

The present invention relates to the vertical type constant feed apparatus for use in pulp fabric handling equipment, a rock wool sprayer, etc.

This type of conventional constant feed apparatus has a hopper into which a material is fed, which hopper is tapered toward its lower part, and a feeding out means such as, for example, a blower at the tapered end, and is therefore disadvantageous in that the material is prone to form a bridge in the tapered end of the hopper.

An object of the present invention is to provide the constant feed apparatus which can eliminate such bridging of material by rotating a rotary arm at the bottom surface of a tubular housing.

Another object of the present invention is to provide the constant feed apparatus in which a transverse frame is provided in the tubular housing to form a soft bridge of material and the material is supplied to the rotary arm while destroying any other bridge of material which might be formed.

Another object of the present invention is to provide the constant feed apparatus in which another constant feed mechanism is provided in the tubular housing into which the material is fed to make it possible to exercise dual control of the amount of material to be fed.

SUMMARY OF THE INVENTION

The present invention provides a constant feed apparatus which comprises a tubular housing into which, for example, pulp fabric, rock wool or powdery or granular material is supplied, at least one rotary arm which is provided in the proximity of the bottom surface of said tubular housing and rotates in the lateral direction, at least one discharging port which is open through the wall including the bottom surface of the tubular housing opposed to said rotary arm, and a driving means such as, for example, a motor which rotates said rotary arm, the material supplied into said tubular housing being guided to the discharging port by said rotary arm and discharged from the discharging port.

BRIEF DESCRIPTION OF THE DRAWINGS

For a fuller understanding of the invention, reference may be made to the following detailed description taken in connection with the accompanying drawings wherein:

FIG. 1 is a side view of the apparatus according to the present invention,

FIG. 2 is a vertically sectional view of the apparatus,

FIG. 3 is a sectional view along the III—III line shown in FIG. 2.

FIG. 4 is a cross sectional view which illustrates the operation of said apparatus, FIGS. 5A to 5K are respectively cross sectional views of the principal part of said apparatus each showing an embodiment of the bottom surface of the tubular housing for use in the apparatus according to the present invention, FIGS. 6A to 6C are respective plan views each of which illustrates an embodiment of the bottom surface of the tubular housing of said apparatus, FIGS. 8A to 8K are respective sectional views each of which illustrates an embodiment of the discharging port of the tubular housing of said apparatus, FIGS. 10A to 10E are respective plan views each of which illustrates an embodiment of the transverse frame of the tubular housing of said apparatus, FIG. 15 is sectional elevation view which illustrates another embodiment of the apparatus according to the present invention, FIG. 16 is a sectional view along the line X—X shown in FIG. 15, FIGS. 17 to 19 are respective side views each of which illustrates another embodiment of the apparatus according to the present invention.

DETAILED DESCRIPTION OF THE INVENTION

Figure 7A:
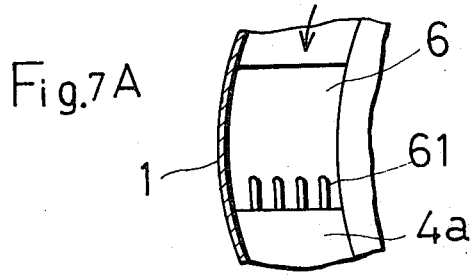
FIGS. 7A to 7F are respective partial plan views of a principal part and each of which illustrates an embodiment of the discharging port of the tubular housing of said apparatus.

In FIGS. 1 to 3, the tubular housing 1 is provided with wheels 2 at its lower end and a driving source such as, for example, the motor 3 at the underside of the bottom of the tubular housing 1.

Said tubular housing 1 is provided with a discharging port 6 in the bottom 4 and said discharging port 6 is provided with a feeding out means such as, for example, a blower 7 if required.

The bottom 4 of said tubular housing 1 is conically formed and provided with the rotary shaft 8 at its center on which at least one rotary arm 9 is provided.

Said rotary shaft 8 is rotated by said motor 3 whereby said rotary arm 9 is rotated in the horizontal direction in the tubular housing 1.

The outer end of said rotary arm 9 moves in the proximity of the bottom 4 of the tubular housing 1 and extends close to the internal surface of the side wall 5 of the tubular housing 1 so that the material 10 fed into the tubular housing 1 is fed to the discharging port 6.

Though the bottom 4 of said tubular housing 1 can be flat, it is preferably formed to the conical so that the center of the bottom 4 protrudes inside the tubular housing 1 as shown in the embodiment. The apparatus thus formed is advantageous in that the material 10 supplied is conveyed to the periphery of the bottom 4 by virtue of a centrifugal force arising from rotation of the rotary arm 9 and can be efficiently discharged through the discharging port 6 provided at the periphery of the bottom 4.

Said bottom 4 is provided with a groove 4a at its periphery so that it surrounds the bottom as shown in FIG. 2, and a tongue 9a which fits into said groove 4a is provided at the end of said rotary arm 9.

A hopper 11 is removably mounted on the upper part of said tubular housing 1 and provided with the handle 12 if required.

A traverse frame means 13 is provided in said housing 1 which orthogonally intersects the vertical axis of the tubular housing 1 and serves to form a soft bridge of material 10.

A sufficient clearance should be left between this transverse frame means and the rotary arm 9 to avoid clogging by the material 10, which can be fluently moved below the transverse frame.

The present invention provides a constant feed apparatus which comprises the vertical type tubular housing 1, rotary shaft 8 provided at the center of the bottom of said tubular housing 1, rotary arm 9 which is provided on said rotary shaft 8 and rotates in the lateral direction in the proximity of the bottom 4 and the discharging port 6 for discharging the material 10 fed by the rotary arm 9 outside the tubular housing 1.

The apparatus according to the present invention is advantageous in that the material 10 supplied is conveyed by the rotary arm 9 to the discharging port 6, and the bridging of material 10 can therefore be effectively prevented by increasing the diameter of the tubular housing 1 and the material 10 is laterally moved in the peripheral direction of the tubular housing 1 since the material 10 is stirred by the rotary arm 9 at the lower part of the tubular housing 1, whereby any bridge of the material is destroyed.

Such an apparatus is, however, disadvantageous in that the total weight of the material 10 supplied is applied to the rotary arm 9, the rotation of the rotary arm 9 is hindered and the constant feed is difficult if the quantity of material 10 is increased.

The resent embodiment provides a constant feed apparatus which can eliminate such disadvantage. The apparatus in the present embodiment is provided with said transverse frame means 13.

In the apparatus according to this embodiment, the transverse frame means has sufficient openings therethrough that the material 10 forms what is hereinafter called a soft bridge 10'', the material 10' below the transverse frame means 13 being moved separately from the material 10 on said transverse frame means 13 and discharged from the discharging port 6. At the same time, when a void S is formed below the material 10 on the transverse frame means, the soft bridge of material 10'' on the transverse frame means 13 is destroyed by an interference action such as vibration, engagement, pulling, etc. due to the flow of the material 10' below the transverse frame means 13 in addition to the weight of material 10, and the material thus falls down below the traverse frame 13.

Accordingly, when the apparatus in accordance with the resent embodiment is used, the weight of the material 10 applied to the rotary arm 9 is limited to only the weight of the material 10' below the transverse frame means 13 and therefore the construction of the rotary arm 9 can be simplified and the motor 3 can be compact even though a large amount of material is fed into the hopper 11.

The embodiment also provides a constant feed apparatus in which the bottom 4 of tubular housing 1 conically protrudes into the tubular housing 1, the groove 4a provided with the discharging port 6 is disposed at the periphery of the bottom and the tongue 9a which fits into said groove 4a is provided at the end of said rotary arm 9. This apparatus can control the amount of material 10 discharged to a specified value and provide an efficient discharging effect.

In the apparatus according to this embodiment, since the material 10 is conveyed to the periphery by the conically tapered bottom 4 and only the material staying in the groove 4a is fed to the discharging port 6, the amount of the material 10 to be discharged is controlled so as to be constant and all of the material 10 in the tubular housing 1 can be fed to the groove 4a.

Figure 13:
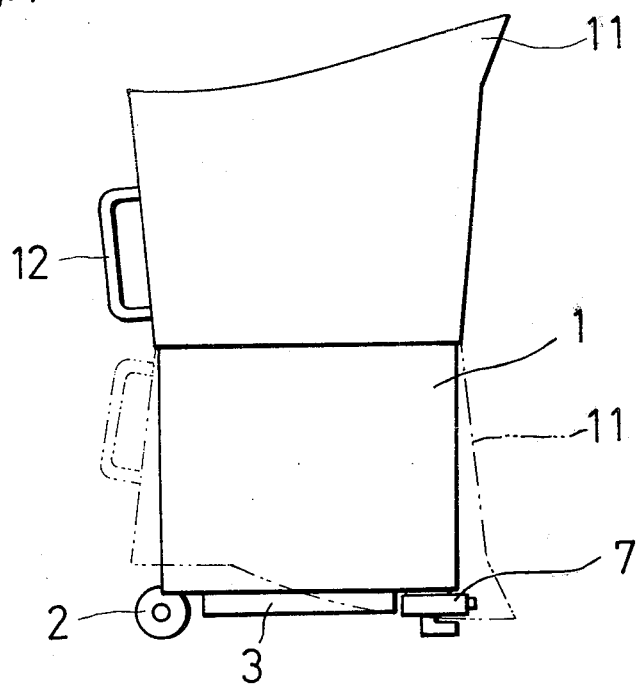
FIG. 13 is a side view which illustrates another embodiment of the apparatus according to the present invention.

The embodiment provides a constant feed apparatus in which the hopper 11 which is tapered upwardly toward the open top is provided on said tubular housing 1 as shown in FIG. 13 and provided with the handle 12, and said hopper 11 is characterized in that it can be removed from said tubular housing 1 and placed on the tubular housing 1 by turning it up side down after the hopper 11 is removed from the tubular housing 1, thus facilitating transportation and providing a compact construction for storage.

The bottom 4 of the tubular housing in said embodiment can be changed to any desired form as shown in FIGS. 5A to 5G.

FIG. 5A shows a horizontally flat bottom 4. In this case, the rotary arm 9 is made of a strip.

FIG. 5B shows a centrally convex bottom 4 with a wide annular recessed surface 4b at its periphery.

FIG. 5C shows a bottom 4 the center of which is conically concave. In this case, the material 10 is collected at the center and taken out through the discharging port 6 at the center.

FIG. 5D shows a bottom 4 which is provided with a flat convexity at its center and the groove 4c at its periphery, and FIG. 5E shows the construction of a bottom 4 with the discharging ports 6 and 6' which are open from the dual grooves 4d and 4f.

Said bottom 4 can be inclined as shown in FIGS. 5F through 5G and, in these cases, the rotary arm 9 is also inclined.

The groove 4a can be U-shaped as shown in FIG. 5H or V-shaped as shown in FIG. 5I or formed by the corner between the bottom 4 and the side wall 5 as shown in FIG. 5J. Actually, the groove 4a having an internal groove wall 4a' which is inclined as shown in FIG. 5K is preferable.

Said discharging port 6 can generally be provided in said bottom 4 or in the side wall 5 and is preferably provided in the groove 4a.

In any case, a plurality of discharging ports 6 can be provided; for example, more than two discharging ports can be provided at the same circumference as shown in FIG. 6A, or the discharging port 6' can be provided at another radial distance from the center of the bottom.

The position of said discharging port 6 in the apparatus according to the present invention can be the eccentric position of the bottom 4 as shown in FIG. 6B or the central position of the bottom as shown in FIG. 6C.

Said discharging port 6 can have a shape as shown in FIGS. 7A to 7F and 8A to 8K.

The discharging port 6 shown in FIG. 7A is provided with pins 61 which project toward the material 10 fed in the direction of the arrow and the fabric material 10 is disintegrated or cut by these pins 61.

Figure 7E:
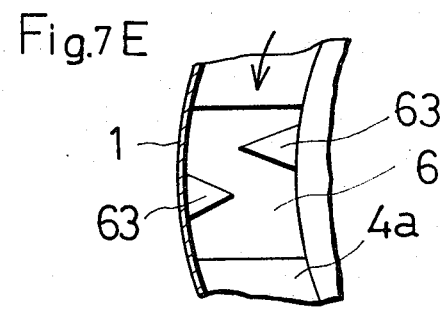
Figure 7B:
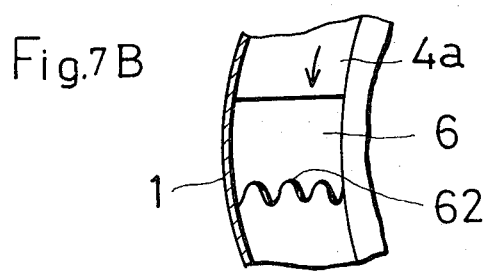
Figure 7F:
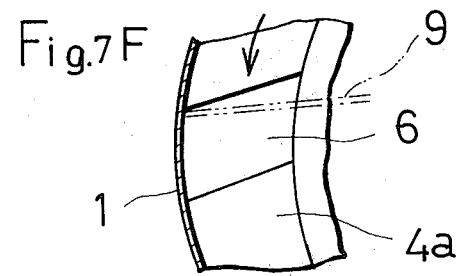
Figure 7C:
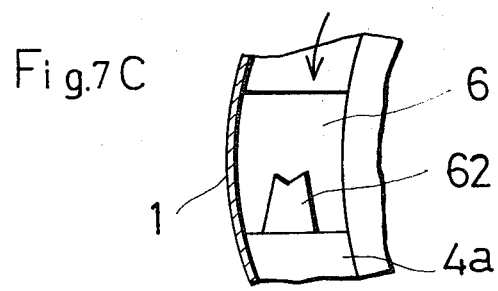
Figure 7D:
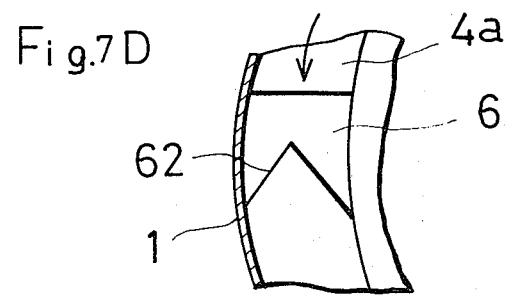

Similarly the discharging port 6 shown in FIG. 7B is provided with a cutter 62 having a plurality of edges instead of said pins 61 and the cutter 62 can project only at the center of the discharging port as shown in FIGS. 7C and 7D.

The discharging port shown in FIG. 7E is provided with at least one cutter 63 which projects at right angles to the forwarding direction of the material 10, which is disintegrated, decomposed, separated and cut by this cutter 63.

Said discharging port 6 can be inclined with respect to the rotary arm 9 as shown in FIG. 7F and the material 10 is thus continuously discharged.

The discharging port shown in FIG. 8A is provided with a projecting member 64 at the edge of the receiving side of the discharging port 6 to guide the material 10 fed in the direction of the arrow downwardly and simultaneously control the amount of material to be discharged. In this embodiment, a better effect is obtained by shifting said projecting member 64 in the material feed direction to control the amount of material to be discharged.

The discharging port 6 shown in FIG. 8B is provided with the pins 61 shown in FIG. 7A which are designed so that the distance the pins 61 project can be varied.

The discharging port 6 shown in FIG. 8C is provided with a roll 65 and the discharging of material is smoothed by rotating the roll 65 in the direction of the arrow and the amount of material to be discharged is set in accordance with the rotation rate of the roll 65.

FIG. 8D shows a rake-up roll 66 such as a brush roll which is provided instead of the roll 65 shown in FIG. 8C.

According to the present invention, the discharging effect can be improved especially when the material 10 is fabric material.

In this embodiment, the material 10 supplied often collects on the rakeup roll 66 and therefore a cleaning means such as cleaning roll 66' is preferably provided.

In the above embodiments, a rotary bar which rotates in a lateral direction can be provided instead of said rolls 65 and 66.

The discharging port 6 shown in FIG. 8E is adapted to support the pins 61 or the projecting members as shown in FIG. 7A by spring 67 to discharge the material 10 by a resilient force of the pins 61, and, in this embodiment, a better result is obtained by shifting the pins in the direction of the arrow to vary the angle of the pins.

The discharging port 6 shown in FIG. 8F is provided with said pins 61 which are urged horizontally by the spring 67. Also in this embodiment, the pins are adapted to cause the material to fall down by their resilient force. In this embodiment, it is more convenient to shift the pins 61 in the direction of the arrow as described above for adjustment of the distance they project.

The discharging port 6 shown in FIG. 8G is provided with at least one upright cutter 68 so that the material 10 such as rock wool ore pulp fabric is cut or decomposed.

The discharging port 6 shown in FIG. 8H is provided with the pins 61 on the projecting member at the opening and at the feed side for the material 10 so that the amount of material to be discharged can be varied by displacing the pins 61 or the projecting member to a lower position as shown with the broken line.

The pins 61 or the projecting member can be provided at the opening edge on the receiving side of the discharging port 6 as shown in FIG. 8I. In this case, the amount of material to be discharged can be increased not only by displacing the pins to the lower position but also by displacing them on the upper position as shown with the broken line.

Said cutter 68, as shown in FIG. 8J, can be provided at the opening edge which is extended downward at the feeding side of the discharging port 6. In this case, if the extended opening edge is made of a resilient material, the cutting effect is more improved.

As shown in FIG. 8K, said discharging port 6 is advantageous in that the opening edge at the feeding side can be extended to a position below the opening edge at the receiving side to form a duct 69 and the amount of discharge can thus be controlled by the duct 69.

The traverse frame means 13 can be constructed so that the material 10 supplied forms a soft bridge, and the construction of the transverse frame means 13 is varied depending on the diameter of the tubular housing 1 or the nature of the material 10 to be fed.

Figure 9:
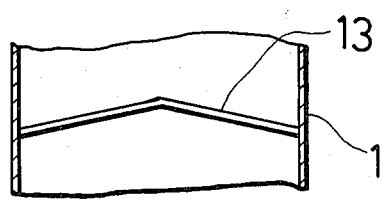
FIGS. 9A to 9D are respective sectional views each of which illustrates an embodiment of the transverse frame in said apparatus.
Figure 9:
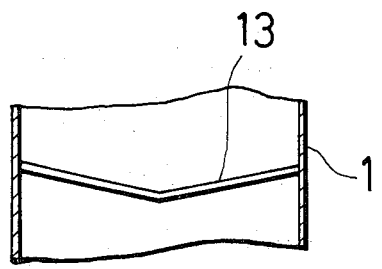
Figure 9:
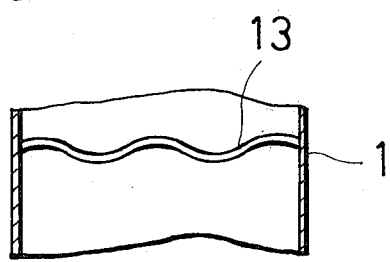
Figure 9:
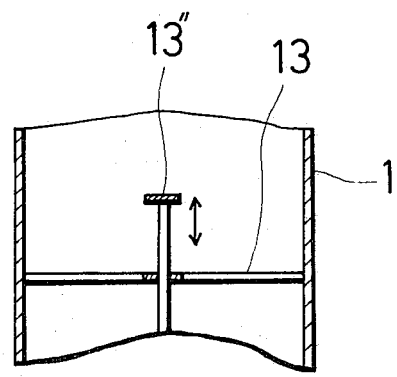

The transverse frame means 13 can be a frame which is convex or concave at its center as shown FIG. 9A or 9B and can be corrugated as shown in FIG. 9C.

Said transverse frame means 13 can be a frame having a flat Y shape as in FIG. 3. It can be made of a single bar as shown in FIG. 10A for material 10 which is apt to form a bridge, whereas the clearance 13' formed in the frame can be reduced as shown in FIG. 10B or 10C for material 10 which has difficulty in forming the bridge. Moreover, the transverse frame means 13 can be a plurality of free-ended frame members extending radially inwardly from the housing 1 as shown in FIG. 10D.

Said transverse frame means 13 can be made by overlapping a plurality of transverse frames 13 and 13" which have different openings as shown in FIGS. 9D and 10E. In this case, if one of these transverse frames 13 and 13", for example, the upper transverse frame 13" is made slidable in the vertical direction so that it can be positioned away from or close to the lower transverse frame 13 as required, the area of the opening in the transverse frame means can be varied in accordance with the type of material to be fed and the difficulty in forming the bridge can be controlled.

Figure 11:
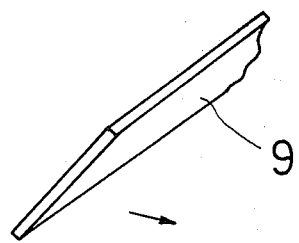
FIGS. 11A to 11D are respective perspective views each of which illustrates an embodiment of the rotary arm of said apparatus.
Figure 11:
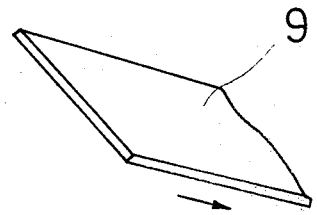
Figure 11:
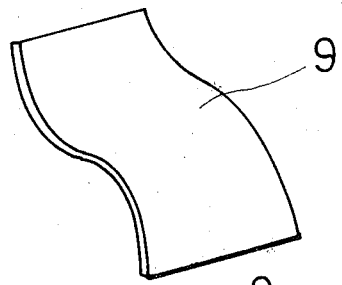
Figure 11:
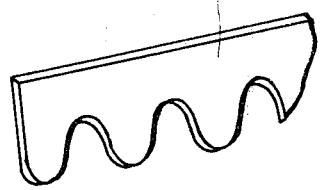

Said rotary arm 9 serves to push down the material 10 if it is inclined, as shown in FIG. 11A, relative to the forward direction shown with the arrow so that it depresses the material from the upper side, and serves to rake up the material 10 from the lower side if it is inclined, as shown in FIG. 11B, relative the forward direction shown with the arrow so that it pushes up the material. Thus the rotary arm 9 engages and moves the material 10" bridged on the transverse frame means 13 down. Furthermore, if the rotary arm 9 is corrugated as shown in FIG. 11C, the material 10 can be fed concentratedly in a specified width and if the rotary arm 9 is sawtoothed as shown in FIG. 11D, the raking up effect is greatly improved.

Figure 12:
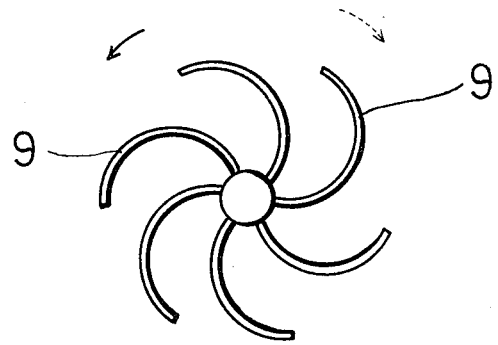
FIG. 12 is a plan view which illustrates an embodiment of said rotary arm.

Moreover, said rotary arm 9 can be bent as viewed from above as shown in FIG. 12. In this case, when the rotary arm 9 is rotated in the direction shown by the solid arrow, the material is fed toward the center and, when it is rotated in the direction shown by a broken line arrow, the material 10 is pushed out in the outward direction.

Figure 14:
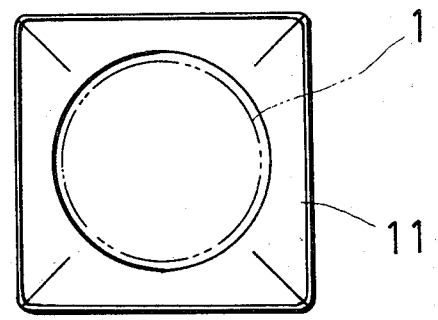
FIGS. 14A and 14B are plan views which illustrate other embodiments of the hopper for use in said apparatus.
Figure 14:
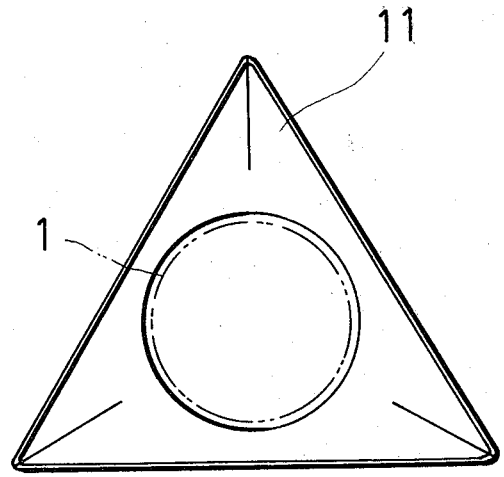

The hopper 11 is constructed so that it can cover the tubular housing 1 as shown with a broken line in FIG. 13 when the hopper is turned upside down. As shown in FIG. 14A or 14B, the horizontal cross section of the hopper 11 can be square or triangular, or it can also be polygonal or elliptical.

The pair of said wheels 2 can be fitted on the same side as the handle 12 as shown in FIGS. 1 and 13. If desired, the wheels can be provided at the lower part on the opposite side from the handle.

If said bottom 4 is formed conically as shown in FIG. 2 or protrudes into the tubular housing 1 as shown in FIGS. 5D to 5G, it is advantageous in that the motor 3 or the like can be housed in the space thus formed therein as shown, for example, in FIG. 2.

Figure 17:
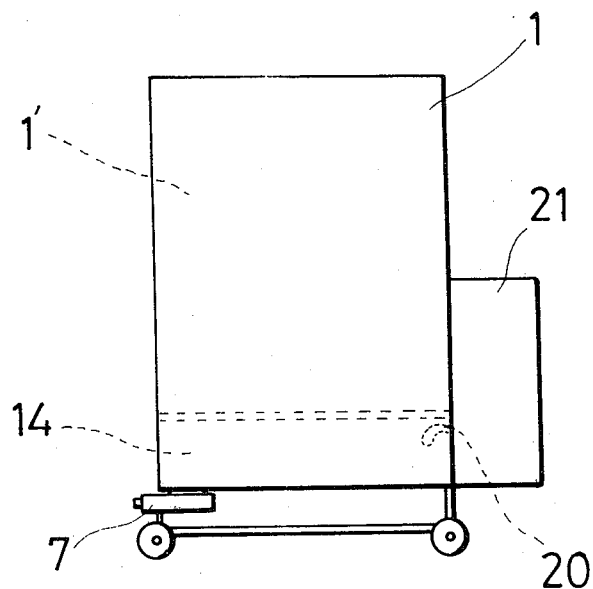

In a further embodiment, said tubular housing 1 as shown in FIGS. 15 to 17 includes at least one additional internal chamber 14 in its lower part and, in this internal chamber 14, the bottom 15 is the same as said bottom 4, and a rotary shaft 16 and at least one rotary arm 17 are provided, and at least one discharging port 18 for the material 10 conveyed by this rotary arm 17 is provided at the bottom 15 or the side wall 19 of the lower part of the tubular housing which is connected to the bottom 15 and the material 10 is supplied into this internal chamber 14 from the discharging port 6 of the upper internal chamber 1'.

In the apparatus according to the present invention, a fixed quantity of material 10 supplied from the upper internal chamber 1' can be further controlled quantitatively in the internal chamber 14 and water can be sprayed the the internal chamber 14 to wet the material 10 or cement, adhesive, pigment, etc. can be added to the internal chamber 14 to mix them in the material 10 supplied.

Therefore, a supplying port 20 for the internal chamber is preferably provided and, if desired, a hopper 21 for supplying additives can be provided as shown in FIG. 17. In this embodiment, it is preferable for disposal of the material 10 in the internal chamber 14 to shift the positions of the discharging port 6 of the upper internal chamber 1' and the discharging port 18 of the internal chamber 14 out of vertical alignment as shown in FIG. 16 and construct the internal chamber 14 so that the material 10 fed from the discharging port 6 into the internal chamber 14 reaches the discharging port 18 after having been circulated through the internal chamber 14. Therefore, the rotary arm 9 and the rotary arm 17 of the internal chamber can be rotated in the same direction as shown in FIG. 16 and the discharging port 6 of the upper internal chamber 1' can be arranged at a position ahead of, relative to this direction, the discharging port 18 of the lower internal chamber.

Said rotary shaft 16 can be coaxial with the rotary shaft 8 of upper internal chamber 1' or separately provided. The latter case, it is advantageous in that the rotation rate can be determined for the respective rotary shafts and the direction of rotation can be different.

The tubular housing 1 is generally made as a vertically straight drum or, if desired, the upper part of the tubular housing 1 can be made in another form and at least the lower part of the tubular housing in which the rotary arm 9 rotates can be made in a straight drum form.

Furthermore, said tubular housing 1 is generally made in a straight upright form but it can be slantedly positioned for convenience in supplying the material, if desired. In any case, the tubular housing can be an upright type.

In said tubular housing 1, if desired, a stirring means, for example, one or a plurality of rotary stirring bars 22 can be provided as shown in FIG. 2 to destroy the bridge of material by applying a force from the stirring bars 22 to the material, or improve the feeding of the material 10 supplied.

Said rotary arms 9 and 17 can be provided in a plurality of tiers and, in this case, the rotation rate and the direction of rotation of the rotary arm in each stage can be varied.

Said bottoms 4 and 15, as shown in FIG. 6A, are preferably provided with a large discharging port 6" which is generally closed so that the material 10 in housing 1 can be quickly removed by opening this discharging port 6" as required. This is advantageous in that the operation efficiency at the completion of work or in changing the type of material being handled is improved.

Said discharging port 6 is generally provided with another constant feed device such as, for example, a rotary valve or other transporting means such as, for example, a belt conveyor, screw conveyor, etc. and the material discharged by the tubular housing 1 is secondarily processed by such means.

The constant feed apparatus shown in said embodiments can be used as a sprayer when it is equipped with a compressor 23, water pump 24 and nozzle 25.

Figure 18:
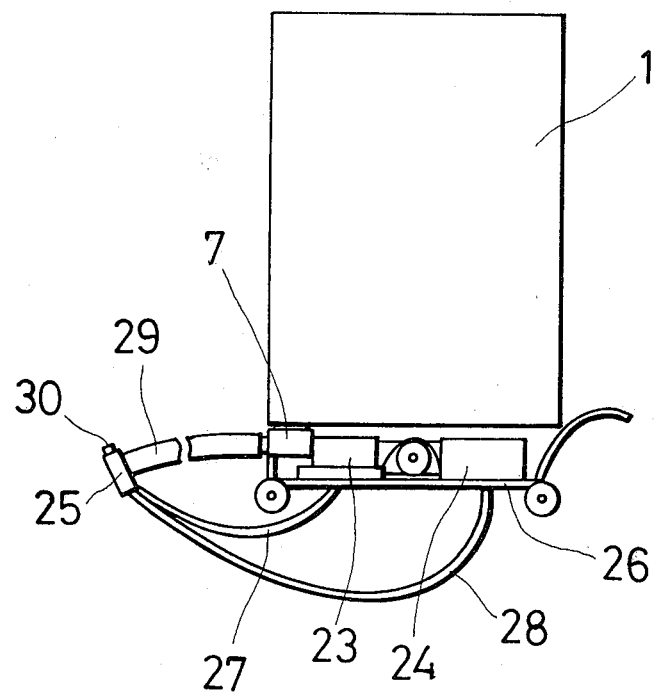

FIG. 18 shows such a constant feed apparatus. In FIG. 18, said blower 7, compressor 23 and water pump 24 are mounted on the chassis 26. The compressed air from the compressor 23 is supplied to the nozzle 25 through the air supply hose 27, water from the water pump 24 is supplied to the nozzle 25 through the water supply hose 28 and mist-sprayed by means of said compressed air, and, and rock wool or other fabric material is supplied to the nozzle 25 through the main hose 29, sprayed and wetted with said sprayed water.

This embodiment need not always have both the water compressor 24 and the compressor 23 and can be provided with only one of them.

The nozzle 25 is provided with a switch 30 for remote control of said compressor 23, blower 7, water pump 24 and motor 3.

In said embodiment, the water pump 24 and the compressor 23 as well as the tubular housing 1 are mounted on the chassis 26 but the water pump 24 and the compressor 23 can be installed on a separate base frame from the tubular housing 1 or said water pump 24 and the compressor 23 can be separately installed so that they can be communicated with the tubular housing 1 as required.

As described above, the material 10 is required to be wetted depending on its type when this apparatus is used as a sprayer.

Another embodiment relates to a constant feed apparatus which is provided with a liquid supplying means as described above.

Figure 19:
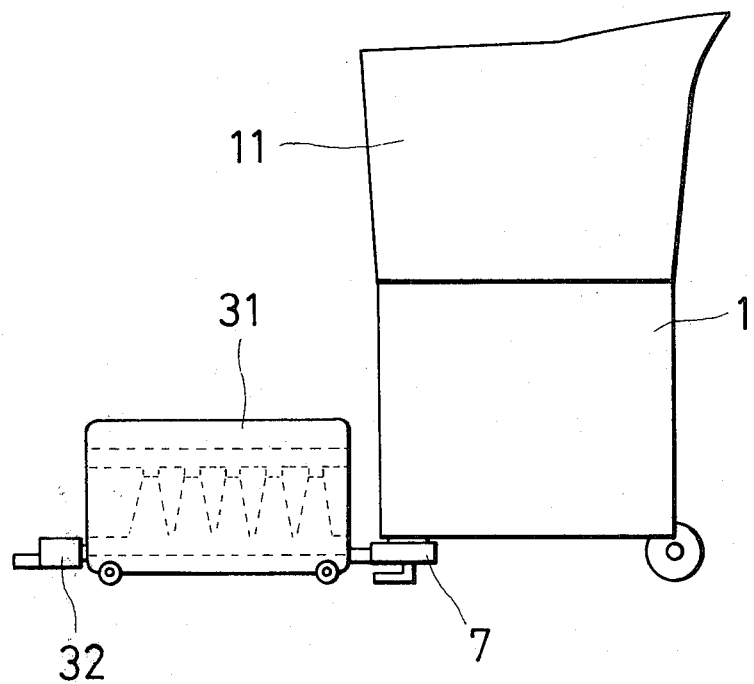

The apparatus according to this embodiment, as shown in FIG. 19, is provided with another liquid supplying means such as, for example, a shower mechanism 31 so that the material 10 is wetted between the position where the material is fed into said tubular housing 1, for example, the hopper and the final take-up position, for example, the spray nozzle in case of the embodiment shown in FIG. 18, and the material 10 can be appropriately wetted by this liquid supplying means.

In the embodiment shown in FIG. 19, the material 10 is wetted by the shower mechanism 31 after having been discharged from the tubular housing 1 and further supplied to the other take-out apparatus 32 such as a rotary valve and screw conveyer.

The apparatus according to this embodiment is advantageous in that the material 10 is supplied with liquid while it passes through this apparatus and therefore the material can be mixed well with the liquid supplied.

In the above description, an example of the apparatus in which the material 10 is wetted with water is shown. The liquid to be mixed in the material 10 in this apparatus is not limited to water and can be other types of liquid such as, for example, a chemical or medical solution such as an adhesive solution or an insecticide solution.

Figure 20:
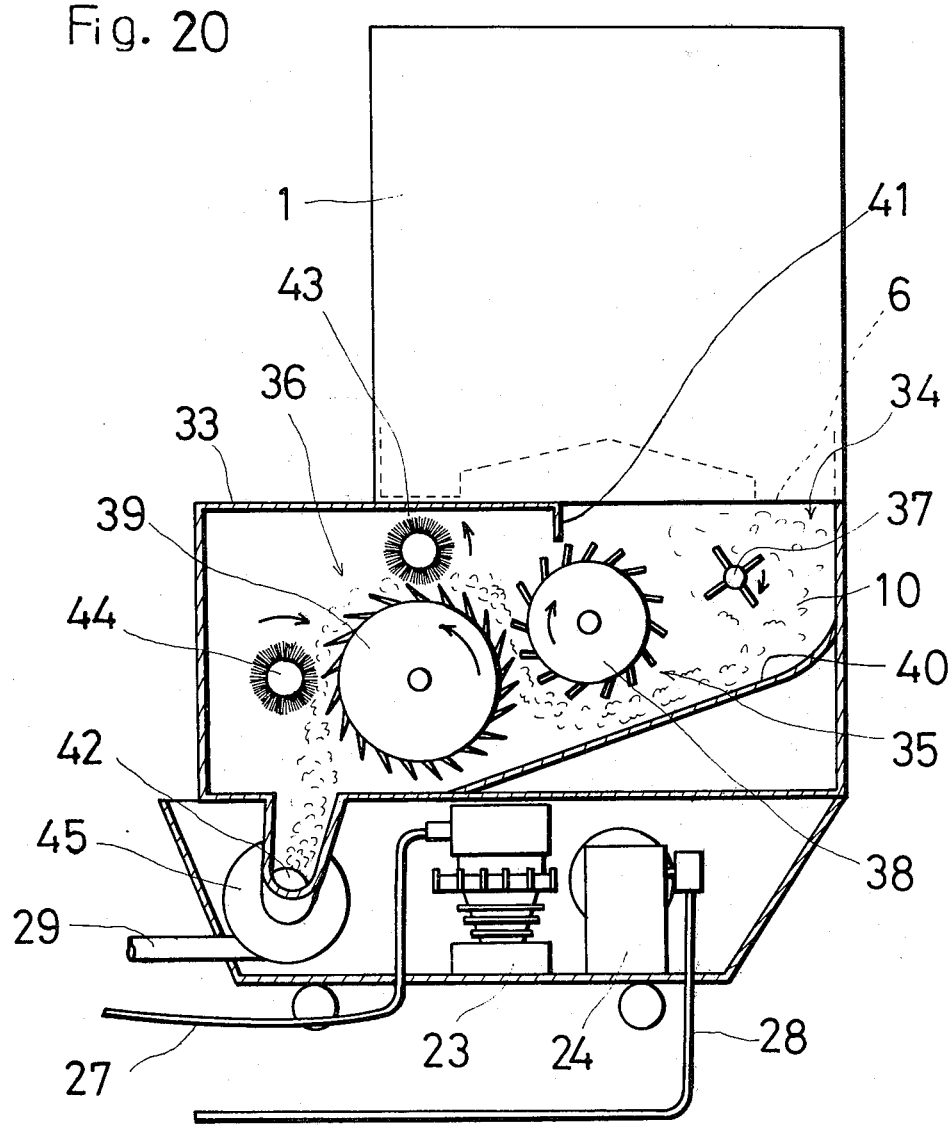
FIG. 20 is a partly cutaway side view which illustrates another embodiment of the apparatus of the present invention.

The following describes a further embodiment according to FIG. 20. The present invention provides the constant feed apparatus according to the preceding embodiments to which the rotor type constant feed mechanism 33 is coupled, thereby controlling the amount of material 10 to be fed.

This constant feed mechanism 33 has a material receiving part 34 which is, for example, detachably communicated with the discharging port 6 or 18 of said tubular housing 1, and a transfer part 35 and a feeding out part 36, and said material receiving part 34 is provided with a stirring rotor 37 which rotates in the vertical direction and is provided with stirring projections. Said transfer part 35 is provided with a turning member 38 cooperating with a downwardly inclined lower wall 40, and said feeding out part 36 is provided with a feed out rotating member 39 with, for example, raking teeth thereon.

The material 10 fed into said material receiving part 34 is fed to the downwardly inclined wall 40 by rotation of said stirring rotor 37 in the direction of the arrow and supplied to the turning member 38 of said transfer part 35.

The turning member 38 consists of a rotatable member in the form of a roll or an endless belt having plates thereon inclined in the direction of rotation thereof, and the material is fed to the rotating member 39 by the plates on the turning member 38, any material not being fed being carried over the top of the roll and returned to the material receiving part 34.

Therefore, the turning member 38 is turned in the direction of the arrow shown in the figure and provided with a gaurd 41 therefore.

The material 10 fed from said transfer part 35 to the feeding out part 36 is placed on the rotating member 39 by the turning member 38, raked by the raking pins on the rotating member 39 and conveyed to the discharging port 42. This feed out rotating member 39 consists of a roll or an endless belt and has opposed thereto feed amount control means such as, for example, a brush roller 43, and the amount of material to be fed by the feed out rotating member 39 is controlled by the clearance formed between the brush roller 43 and the feed out rotating member 39.

Accordingly, any surplus of material exceeding this controlled feed amount is swept off the rotating member 39 by the brush roller 43 and returned by said feed out turning member 38 to the receiving part 34.

Said brush roller 43 is driven by an operating mechanism, which is not shown, which is movable toward and away from the feed out rotating member 39, whereby the clearance between the brush roller 43 and the feed out rotating member 39 can be adjusted.

Said feed out rotating member 39 is opposed to a scraping means, for example, a brush roller 44 by which the material 10 raked by the feed out rotating member 39 is removed by and falls into a discharge port 42 for being conveyed by a transfer means 45, for example, a blower provided at the discharge port 42.

The embodiment described above provides an advantage that the final amount of material to be fed can be adjusted by said feed mechanism 33.

Thus, the constant feed apparatus in accordance with the present invention can provide a constant feed operation.

What is claimed is:

1. A constant feed apparatus for feeding a dry powdery, fibrous or like material, comprising a straight tubular housing having a circumferential wall and a bottom wall, at least one rotary arm rotating in said tubular housing and having a lower edge moving in proximity to said bottom wall and to the lower end of said circumferential wall said tubular housing having a discharge opening in a portion of the housing wall along which said rotary arm moves, such that rotation of said rotary arm discharges material from the bottom of said tubular housing through said discharge opening, and a transverse frame means, extending across said housing and spaced above said rotary arm, and having therethrough sufficient openings across generally the entire area of the housing such that the material above said frame means is caused to form a soft bridge across said tubular housing at said frame means and thereby remove the weight of said material above said frame means for said rotary arm, and such that upon discharge of sufficient of the material beneath said frame means to create a space just beneath said frame means, additional of the material is allowed to pass downwardly through said openings in said frame means.

2. A constant feed apparatus as claimed in claim 1 in which said rotary arm is a flat blade having the upper edge inclined rearwardly of the lower edge relative to the direction of rotation of the rotary arm.

3. A constant feed apparatus for feeding a dry powdery, fibrous or like material, comprising a straight tubular housing having a circumferential wall and a bottom wall, at least one rotary arm rotating in said tubular housing and having a lower edge moving in proximity to said bottom wall and to the lower end of said circumferential wall, said tubular housing having a discharge opening in a portion of the housing wall along which said rotary arm moves, and a feeding mechanism having a housing with a material receiving part at one lateral end thereof, said discharge opening being directed toward said material receiving part, a discharge port at the other end of said housing, a turning member adjacent said material receiving part and having a rotatable member with a plurality of plates therein inclined in the direction of rotation thereof and rotating in one direction for picking up material from said material receiving part and carrying it under said rotatable member and then upwardly around said rotatable member, and a rotating member adjacent said turning member and between said turning member and said discharge port and having a plurality of raking pins thereon and being rotatable in the opposite direction from said turning member for receiving at least some of the material from said turning member and carrying it to the discharge port, the remainder of the material remaining on said rotating member being carried over the top thereof and returned to said material receiving part, and feed amount control means cooperating with said rotating member for limiting the amount of material carried by said rotating member.

4. A constant feed apparatus as claimed in claim 3 in which said housing has a bottom wall inclined downwardly from said material receiving part to beneath said turning member and from which said turning member picks up the material.

5. A constant feed apparatus as claimed in claim 3 in which said feed amount control means comprises a rotary brush adjacent the upper portion of said rotating member and rotatable in the same direction as said rotating member with the periphery close to the outer ends of said raking pins.

* * * * *